United States Patent
Browne et al.

(10) Patent No.: US 8,887,178 B1
(45) Date of Patent: Nov. 11, 2014

(54) METHOD TO CUSTOMIZE NATIVE OPERATING SYSTEM VIEWS USING WEB TECHNOLOGIES IN MOBILE DEVICES

(71) Applicant: Google Inc., Mountain View, CA (US)

(72) Inventors: Dean Browne, San Carlos, CA (US); Vinod Kumar Ramachandran, Sunnyvale, CA (US); Timothy Raymond Zwiebel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 99 days.

(21) Appl. No.: 13/662,045

(22) Filed: Oct. 26, 2012

Related U.S. Application Data

(60) Provisional application No. 61/717,287, filed on Oct. 23, 2012.

(51) Int. Cl.
*G06F 3/00* (2006.01)
*G06F 9/54* (2006.01)

(52) U.S. Cl.
CPC ........................................ *G06F 9/54* (2013.01)
USPC .......................................................... 719/319

(58) Field of Classification Search
CPC ........................................................ G06F 9/541
USPC ................................................... 719/313, 319
See application file for complete search history.

(56) References Cited

U.S. PATENT DOCUMENTS

| | | | | |
|---|---|---|---|---|
| 6,628,831 | B1 * | 9/2003 | Needham | 382/168 |
| 6,636,245 | B1 * | 10/2003 | Estipona | 715/790 |
| 8,136,100 | B1 * | 3/2012 | Goldman | 717/136 |
| 8,146,107 | B2 * | 3/2012 | Canton | 719/319 |
| 2002/0107894 | A1 * | 8/2002 | Kent et al. | 707/517 |
| 2009/0037517 | A1 | 2/2009 | Frei | |
| 2010/0269030 | A1 | 10/2010 | Dugonjic et al. | |
| 2010/0281400 | A1 * | 11/2010 | Forutanpour et al. | 715/760 |
| 2011/0161988 | A1 * | 6/2011 | Kashyap | 719/319 |
| 2012/0005691 | A1 * | 1/2012 | Wong et al. | 719/319 |
| 2012/0109741 | A1 | 5/2012 | Ballapragada et al. | |
| 2012/0167063 | A1 | 6/2012 | Detwiler et al. | |
| 2012/0278750 | A1 * | 11/2012 | Abraham et al. | 715/779 |
| 2012/0306622 | A1 * | 12/2012 | Trinh et al. | 340/10.1 |

OTHER PUBLICATIONS

Shuo Tang, Trust and Protection in the Illinois Browser Opearting sytem, 2010.*
Can HTML5 videos play inline on an Android browser?, www.quora. com. Aug. 29, 2012.

(Continued)

*Primary Examiner* — Lechi Truong
(74) *Attorney, Agent, or Firm* — McDonnell Boehnen Hulbert & Berghoff LLP

(57) ABSTRACT

Systems, methods, routines and/or techniques for customizing native operating system views using web technologies in mobile devices are described. A messaging system may be used to allow and/or facilitate communication between two or more native views, for example, via one or more software development kits (SDKs). A method may include executing, in a first native operating system view, messaging code to communicate one or more messages from the first native operating system view to a second native operating system view. The method may include executing the software development kit code to receive and/or handle the one or more messages from the first native operating system view and route and/or transmit the one or more first messages to the second native operating system view. In some embodiments, the first native operating system view is a WebView and the second native operating system view is a VideoView.

19 Claims, 8 Drawing Sheets

(56) References Cited

OTHER PUBLICATIONS

Making HTML5 Video work on Android phones, www.broken-links.com/2010/07/08/making-html5-video-work-on-android-phones/. Aug. 29, 2012.

HTML5 <video> element on Android, stackoverflow.com/questions/1711078/html5-video-element-on-android. Aug. 29, 2012.

Easily create apps with the only free open source framework that supports 7 mobile platforms. Phonegap. No date given.

* cited by examiner

METHOD TO CUSTOMIZE NATIVE OPERATING SYSTEM VIEWS USING WEB TECHNOLOGIES IN MOBILE DEVICES

CROSS-REFERENCE TO RELATED APPLICATIONS

This application claims priority from U.S. Provisional Patent Application No. 61/717,287 filed on Oct. 23, 2012. The disclosure of this provisional application is incorporated by reference herein in its entirety.

FIELD

The present disclosure relates to native operating system code on mobile devices, and more particularly to one or more systems, methods, routines and/or techniques for customizing native operating system views using web technologies in mobile devices.

BACKGROUND

Mobile devices such as smartphones have become more advanced. Some smartphones incorporate a processor that runs computer code, including code that implements an operating system (OS). Computer code run by a smartphone may include both native code (i.e., code written by the creator of the smartphone and/or the operating system) and code developed by third parties (e.g., third party applications). To aid third parties in developing applications, the creator of the smartphone and/or the operating system may offer application developers a software development kit (SDK) and/or an application programming interface (API) that can be integrated into applications the developers are creating. An SDK may include a library of native code components, samples and documentation.

Further limitations and disadvantages of conventional and traditional approaches will become apparent to one of skill in the art, through comparison of such systems with some aspects of the present invention as set forth in the remainder of the present application and with reference to the drawings.

SUMMARY

The present disclosure describes one or more systems, methods, routines and/or techniques for customizing native operating system views using web technologies in mobile devices. The systems, methods, routines and/or techniques of the present disclosure may include and/or utilize a messaging system to allow customization of native views. The messaging system may be designed and/or adapted to allow and/or facilitate communication between two or more native views, for example, via one or more software development kits (SDKs).

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

DETAILED DESCRIPTION

Figure 1:
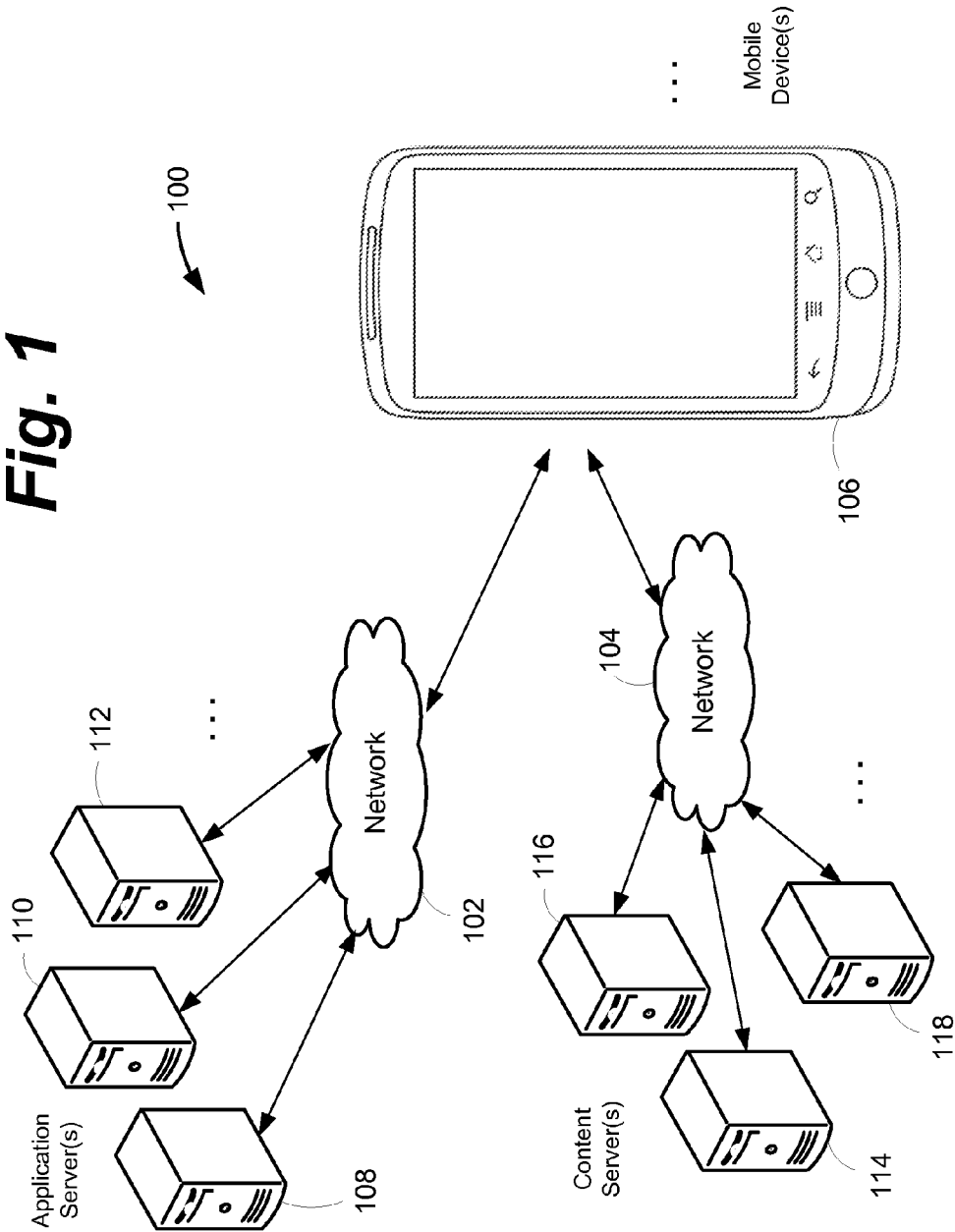
FIG. 1 depicts an illustration of a block diagram showing example components, connections and interactions of a network setup, where one or more embodiments of the present disclosure may be useful in such a network setup.

The present disclosure describes one or more systems, methods, routines and/or techniques for customizing native operating system views using web technologies in mobile devices. The systems, methods, routines and/or techniques of the present disclosure may include and/or utilize a messaging system to allow customization of native views. The messaging system may be designed and/or adapted to allow and/or facilitate communication between two or more native views, for example, via one or more software development kits (SDKs).

The term "native view" or "native operating system view" may refer to a native function or native code (i.e., code written by the creator of the smartphone and/or the operating system) that is run on a mobile device or smartphone. Native views may serve as a way to interface with core functionalities of a mobile device or smart phone, for example, rendering HTML to display a webpage, playing or streaming a video, operating a camera that is incorporated into the smartphone or other core functionalities. A software development kit (SDK), for example, provided to application developers, may include one or more application programming interfaces (APIs) to these native views. It should be understood that references to various native views (e.g., WebView) in this disclosure may be used in a flexible manner to refer to either the native function/code, the core functionality, or the resulting windows, frames, sounds, videos and the like (e.g., the webpage window that gets displayed on the screen of a mobile device or smart phone).

In order to provide a clear description of the various embodiments of the present disclosure, the descriptions provided herein may focus on one or more embodiments that relate to a native WebView and a native VideoView. However, it should be understood that the systems, methods, routines and/or techniques described herein may be applied to various other native views, for example, a MapView that displays interactive maps, a GameView that displays interactive games, a PhotoView that displays local and/or remote photos, a CameraView that displays scenes or pictures as captured by one or more cameras on a mobile device, and/or any other native view. The one or more messaging systems described herein may be adapted to allow and/or facilitate communication between two or more of these native views or other native views.

One or more embodiments of the present disclosure describe one or more systems, methods, routines and/or techniques for customizing native operating system views, for example, a native WebView and a native VideoView. A WebView may refer to a native function or native code that may interface with one or more core functionalities of a mobile device or smartphone. For example, a WebView may be designed and/or adapted to render HTML, JavaScript and the like and may cause a webpage to display on a smartphone. As one example, a WebView may be used by an application developer to create a sort of mini web browser within an application. A VideoView may refer to a native function or native code that may interface with one or more core functionalities of a mobile device or smartphone. For example, a VideoView may be designed and/or adapted to cause a video to be streamed and/or played on the display of a smartphone. The VideoView may be adapted to handle local video files (i.e., video files stored on local storage in a smartphone) or remote video files (i.e., video files that are retrieved from a remote server or device). The systems, methods, routines and/or techniques of these embodiments may include and/or utilize a messaging system to allow and/or facilitate communication between a WebView and a VideoView. In one example implementation, a messaging system may allow and/or facilitate communication between a WebView that generates a webpage, for example, with one or more transparent frames, and a VideoView that generates a video, for example, where the video is playing behind the webpage and is visible through the transparent frame(s).

Regarding the one or more embodiments of the present disclosure that relate to a native WebView and a native VideoView, it may be beneficial to describe an example challenge that a developer (and/or the creator of the smartphone and/or the operating system) may face. HyperText Markup Language (HTML) may refer to a markup language for displaying web pages and other information that can be displayed in a web browser or web client. Newer versions of the HTML language (e.g., HTML5) have attempted to offer additional or enhanced multimedia functionality, for example, by offering a <video> tag that may embed a video within a webpage. Various versions of operating systems that run on various versions of mobile devices may not be programmed and/or adapted to handling these <video> tags in a manner such that the video plays "in-line" (i.e., within the webpage). Instead, the video tag may cause the operating system's native media application to play the video, often in full screen mode, making it difficult to wrap or overlay the video with content, for example, buttons, advertisements or other elements, for example, HTML elements. Various mobile devices users may not have access to an updated operating system that may be adapted to handle <video> tags, for example, because mobile device vendors may control when updates to operating systems are released and/or distributed.

One or more embodiments of the present disclosure describe one or more systems, methods, routines and/or techniques to customize a native WebView and a native VideoView, for example, such that HTML <video> tags may be handled in a manner such that it appears to a user that the video is playing "in-line." Various methods, routines and/or techniques described herein may allow an application developer to incorporate interesting content with in-line video on a webpage, and the application may display as intended even if a user's phone has an older version of an operating system that may not support HTML <video> tags. The content may include advertisements, buttons, or any other elements, for example, HTML elements. Various embodiments of the present disclosure may provide solutions to one or more of the disadvantages discussed above, for example, by implemented solutions in an updated software development kit (SDK) and perhaps additional code. In these embodiments, application developers and/or content developers may be able to implement solutions, for example, the handling of <video> tags, even if a device user does not have access to an updated operating system. Various embodiments of the present disclosure may handle <video> tags by replacing them with custom messaging code, for example, JavaScript code, that implements, models or mimics newer HTML <video> tag specifications.

FIG. 1 depicts an illustration of a block diagram showing example components, connections and interactions of a network setup 100, where one or more embodiments of the present disclosure may be useful in such a network setup. It should be understood that the network setup 100 may include additional or fewer components, connections and interactions than are shown in FIG. 1. FIG. 1 focuses on a portion of what may be a much larger network of components, connections and interactions. Network setup 100 may include one or more networks (for example, networks 102, 104), one or more mobile devices (for example, mobile device 106), a number of application servers (for example, application servers 108, 110, 112) and a number of content servers (for example, content servers 114, 116, 118). Networks 102 and 104 may be mediums used to provide communication links between various devices, such as data processing systems, servers, mobile devices and perhaps other devices. Networks 102 and 104 may include connections such as wireless or wired communication links. In some examples, networks 102 and 104 represent a worldwide collection of networks and gateways that use the Transmission Control Protocol Internet Protocol (TCP IP) suite of protocols to communicate with one another. In some examples, networks 102 and 104 may include or be part of an intranet, a local area network (LAN) or a wide area network (WAN). In some examples, networks 102 and 104 may be part of the same network or group of networks. For example, networks 102 and 104 may both be part of the Internet. Network setup 100 may include one or more mobile devices, for example, mobile device 106. Mobile devices may communicate with application servers and/or content servers via one or more networks.

Figure 2:
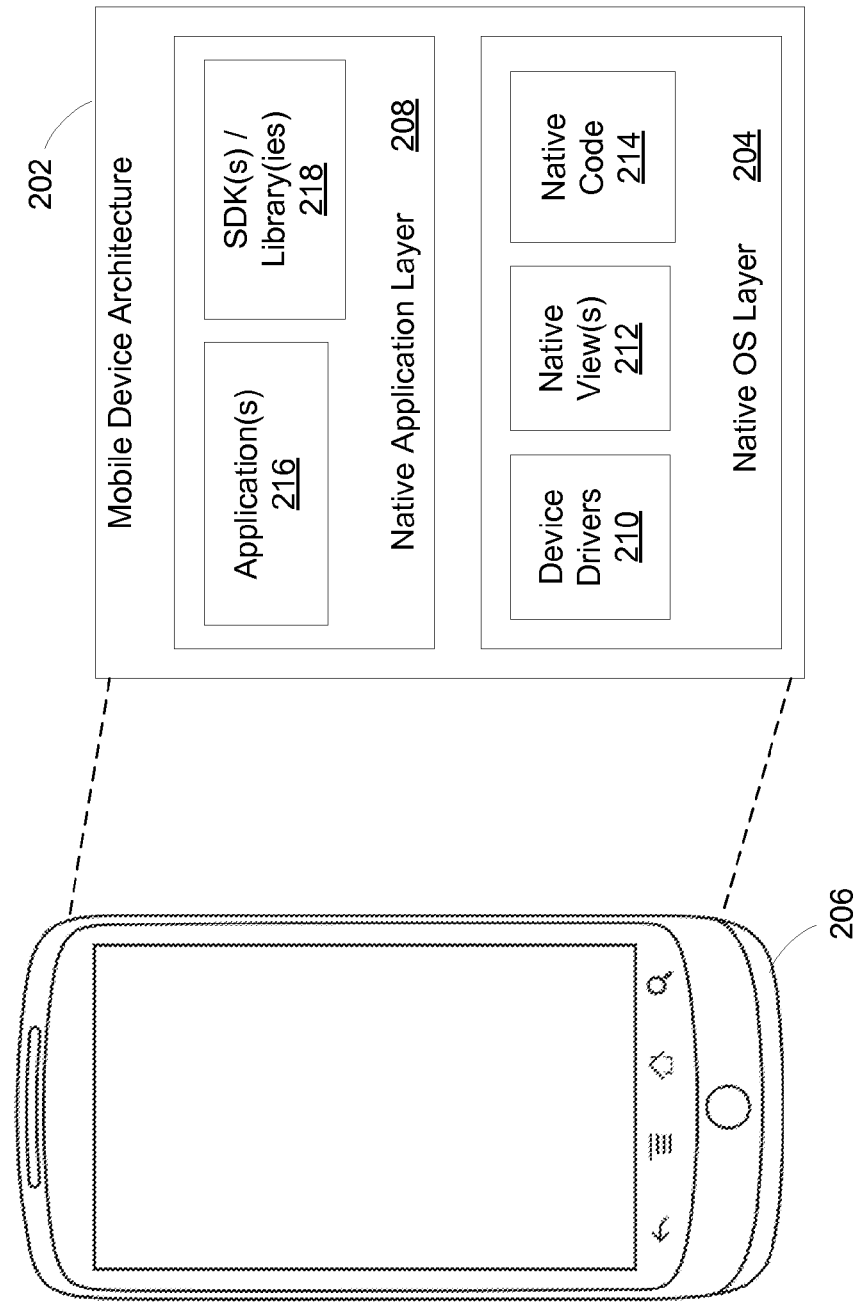
FIG. 2 depicts an illustration of an example mobile device or smartphone and an example mobile device architecture, according to one or more embodiments of the present disclosure.

FIG. 2 depicts an illustration of an example mobile device 206 or smartphone, according to one or more embodiments of the present disclosure. Mobile device 206 may be substantially similar to the mobile device 106 of FIG. 1, for example. Mobile device 206 may incorporate a processor that runs or executes computer code, including code that implements an operating system (OS), other native code (i.e., code written by the creator of the smartphone and/or the operating system) and code developed by third parties (e.g., third party applications). Mobile device 206 may also run or execute code from one or more software development kits (SDKs) and/or one or more application programming interfaces (APIs). The computer code that runs on the mobile device 206 may be conceptualized and/or organized according to a mobile device architecture. FIG. 2 shows one example mobile device architecture 202. Mobile device architecture 202 may include various layers, for example, a native operating system (OS) layer 204 and a native application layer 208. The native OS layer 204 may include various pieces of code or functions, for example, one or more device drivers 210, one or more native views 212 and other native code 214. The native application layer 208 may include various pieces of code or functions, for example, one or more native applications (or applications) 216, one or more SDK(s) and/or libraries 218. Mobile device 206, for example, using hardware, software or a combination of both, may allow and/or facilitate communications between these and other various pieces of code or functions.

Figure 3:
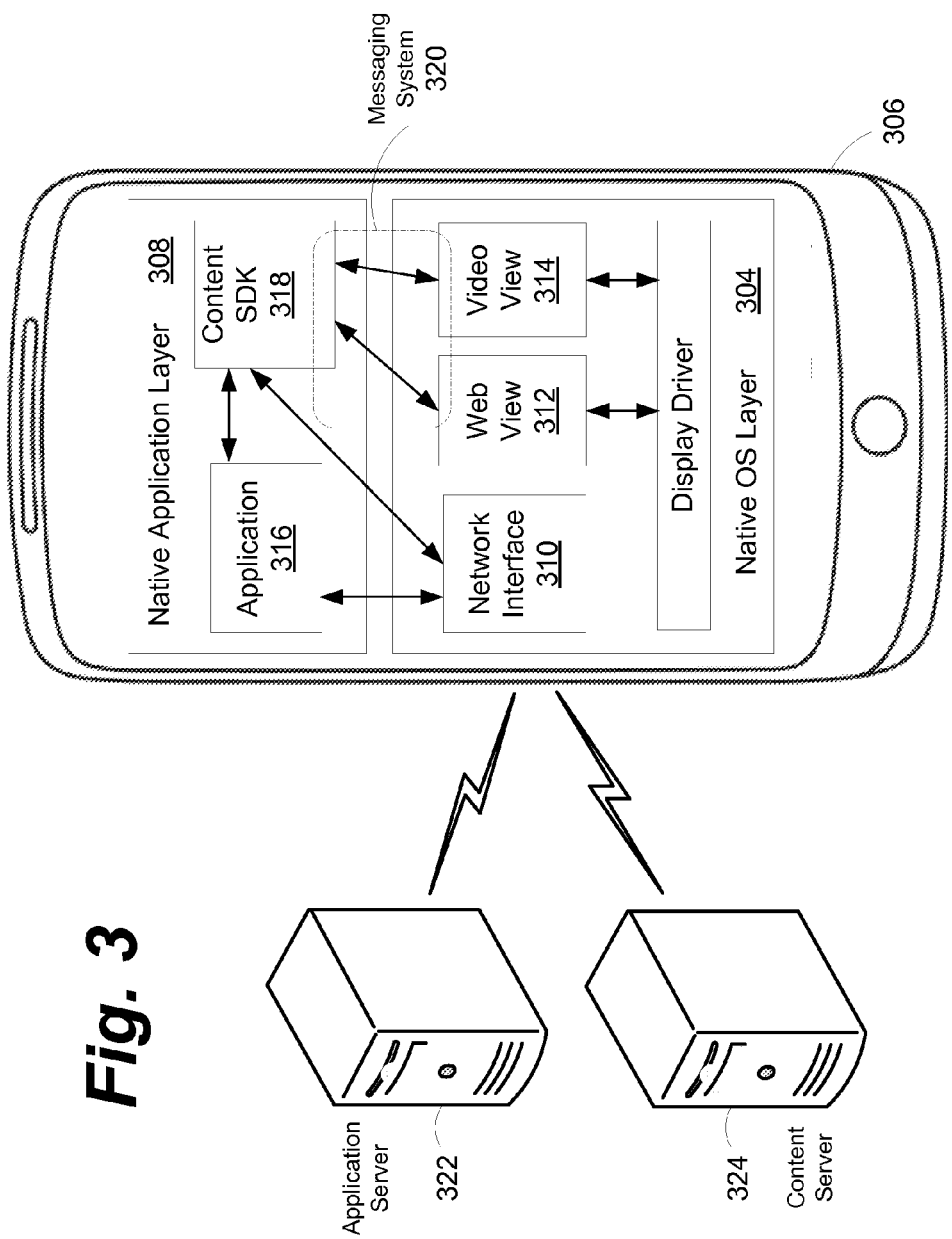
FIG. 3 depicts an illustration of an example mobile device or smartphone and various example pieces of code or functions that may run or execute on a mobile device, according to one or more embodiments of the present disclosure.

FIG. 3 depicts an illustration of an example mobile device or smartphone, 306, according to one or more embodiments of the present disclosure. Mobile device 306 may be substantially similar to the mobile devices 106 and 206 of FIGS. 1 and 2 respectively, for example. FIG. 3 depicts various example pieces of code or functions that may run or execute on mobile device 306, where the various pieces of code or functions may be associated with different parts of a mobile device architecture, for example, a native application layer 308 and a native OS layer 304. Mobile device 306 may include code related to one or more native applications, for example, application 316. Mobile device 306 may download, for example, via network interface 310, application 316 and/or updates to application 316 from one or more application servers, for example, application server 322. Application 316 may incorporate one or more SDKs or libraries into its code, where the one or more SDKs or libraries may adapt application 316 to be able to communicate with one or more pieces of code or functions in the native OS layer 304. As one example, application 316 may incorporate a content SDK 318 that may adapt application 316 to be able to communicate with one or more content servers, for example, content server 324. As one example, content server 324 may provide advertisements and the content SDK may include information about where to get the advertisements, for example, an address of the content server 324. Mobile device 306 may download the content SDK 318 from one or more application servers, for example, application server 322. In some examples, SDK 318 maybe bundled and downloaded along with application 316.

Content SDK 318 may adapt application 316 to be able to communicate with one or more pieces of code or functions in the native OS layer 304, for example, WebView 312 and VideoView 314. WebView 312 may be adapted to render HTML, JavaScript and the like and may cause a webpage to display on the mobile device 306. As one example, a WebView 312 may be used by an application developer to create a sort of mini web browser within an application. VideoView 314 may be adapted to cause a video to be streamed and/or played on the display of the mobile device 306. The VideoView 314 may be adapted to handle local video files (i.e., video files stored on local storage in a smartphone) or remote video files (i.e., video files that are retrieved from a remote server or device).

Content SDK 318 may allow and/or facilitate communications or messages between one or more native views, for example, WebView 312 and VideoView 314. Content SDK 318 may transmit or communicate messaging code (e.g., JavaScript code) to one or more native views, where the messaging code may be executed to transmit and/or receive messages. The messaging code executed by one or more native views, SDK code that is executed in order to facilitate communications or messages between native views, and optionally other related code, may be referred to as a messaging system 320. In one specific example, content SDK 318 may transmit or communicate messaging code (e.g., JavaScript code) to the WebView 312. WebView 312 may execute the messaging code to transmit a message to the content SDK 318, and the content SDK may route or transmit the message to the VideoView 314. WebView 312 may also execute the messaging code to listen for and/or receive messages from the content SDK 318, for example, messages that originated from the Video View 314. In this respect, the WebView and the VideoView may communicate with each other via messaging code executed by the WebView and the content SDK 318.

Referring again to FIG. 3, as one example of one or more embodiments in operation, mobile device 306 may download (i.e., request and receive) an application 316 and a content SDK 318 from an application server 322. The mobile device 306, for example, via an included processor, may execute application 316. At some point, mobile device 306 may execute application code that utilizes the content SDK 318, for example, code that requests the initiation of a customized (e.g., a specific location and/or dimension) WebView 312. Content SDK 318 may receive and/or retrieve HTML code, JavaScript code and/or other code and/or components that may be rendered inside the WebView. For example, the content SDK 318 may download the HTML and/or JavaScript from a remote server, e.g., a content server. As another example, the application 316 may include the HTML and/or JavaScript and may pass it to the SDK 318 when it requests that a WebView be initiated. SDK 318 may then communicate with WebView 312 to create a web browser window, for example, indicating a particular location and/or dimensions for the window. SDK 318 may transmit the HTML code and/or JavaScript code to the WebView 312 such that the WebView 312 can render the HTML and display the associated web page. The HTML code may include code intended to place a video within the web browser window (e.g., using an HTML <video> tag). SDK 318 may transmit messaging code (e.g., JavaScript code) to the WebView 312 that may adapt the WebView 312 to send messages to the content SDK 318 and, in turn, to other native views. For example, the messaging code may be part of the HTML and/or JavaScript code that was received by the SDK (e.g., downloaded from a server) and transmitted by the SDK to the WebView.

The messaging code may be transmitted to the WebView 312 in a number of ways. For example, the HTML and/or JavaScript (e.g., downloaded by the SDK from a server) may have been modified to include the messaging code before the HTML and/or JavaScript was downloaded by the mobile device 306. In this example, the modification may have occurred on a remote server and/or computer prior to downloading. The modification may include detecting <video> tags in the HTML and replacing the tags with messaging code such as JavaScript, and optionally, additional code. As another example, modification code (e.g. JavaScript code) may be transmitted to the mobile device and/or SDK 318 (e.g., when application 316 is downloaded or when the SDK download the HTML and/or JavaScript), and the modification code may be transmitted to the WebView 312 when the HTML and/or JavaScript is communicated to the WebView. In this example, when the WebView 312 renders the HTML, it will execute the modification code, which may modify the HTML to include the messaging code. The modification code may determine whether the mobile device is running an older OS version, for example, by communicating with a user agent. If necessary, the modification code may detect <video> tags in the HTML and replace the tags with messaging code such as JavaScript, and optionally, additional code. As another example, modification code (e.g. JavaScript code) may be stored on the mobile device 306, for example, as part of one or more SDKs, and the modification code may be transmitted to the WebView 312 when the HTML is communicated to the WebView. In this example, when the WebView 312 renders the HTML, it will execute the modification code, which may modify the HTML to include the messaging code.

The messaging code may take various forms and/or may be coded in various ways, for example, such that the WebView can transmit and receive messages to/from the content SDK 318. In some embodiments, the messaging code may create a JavaScript object that imitates the behavior (e.g., creating event listeners, etc.) of an HTML video object. In some embodiments, to send a message, the messaging code may include one or more pieces of JavaScript code that instruct the WebView 312 to navigate to a special URL. In this example, the URL may not resolve to any known address on the internet. The URL may be encoded with one or more messages, flags, tags and the like. The WebView may be designed to notify the content SDK 318 when it attempts to navigate to a URL, and the content SDK 318 may be designed to listen for, parse and handle these special URLs that are encoded with messages and the like. The SDK 318 may stop the WebView 312 from attempting to navigate to the URL, and the SDK 318 may interpret the message encoded in the URL. As another example, to receive a message, the messaging code may include one or more pieces of JavaScript code that instruct the WebView 312 to navigate to a different special URL. The WebView may be designed to receive updates from the content SDK 318 regarding navigation to a URL, and the content SDK 318 may be designed to provide such updates, in effect, creating a listener in the WebView. The SDK 318 may stop the WebView 312 from attempting to navigate to the URL, and the SDK 318 may transmit messages to the WebView via the listener. In some embodiments, messages may be communicated by inserting one or more iframe objects in the HTML code and setting the source of the iframe to a special URL, where the special URL operates similarly to the URLs explained above.

As another example of how the messaging code may communicate with the SDK, in some embodiments, once the messaging code (e.g., JavaScript) has been transmitted to the WebView, the SDK may make calls to the messaging code. For example, the SDK may indicate to the WebView that it should navigate to a particular URL, for example, a special URL using a "javascript:" scheme. When the WebView attempts navigate to the URL, it will instead execute the messaging code. In this respect the SDK may communicate with the messaging code inside the WebView to send and receive messages.

Once the WebView 312 renders the HTML code, it may execute or read the HTML code, including the messaging code and other JavaScript code. The WebView 312 may perform various routines and/or functions according to its purpose, for example, it may create a window that displays on the screen of mobile device 306, to display the webpage associated with the rendered HTML. At some point, the WebView 312 may execute the messaging code, for example, messaging code that relates to a video. This messaging code may be messaging code that was inserted in place of a <video> tag. In other words, the WebView 312 may determine that a video should be played. By executing the messaging code, the WebView 312 may be adapted to transmit and receive messages to/from the content SDK 318. The WebView 312 may communicate a message to the content SDK 318 instructing the content SDK to initiate a VideoView 314, for example, a video window with a particular size and screen location. The content SDK 318 may communicate with the VideoView 314 such that the VideoView 314 causes a video window to display on the mobile device 306. At this point a WebView 312 and a VideoView 314 may be displayed on mobile device at the same time. The VideoView 314 may start to download the video from one or more sources, for example, as indicated in the message transmitted from the WebView.

VideoView 314 may be adapted to communicate with the content SDK 318 with or without using special messaging code transmitted to the VideoView 314 from the content SDK 318. VideoView 314 may transmit various messages to the content SDK, which may be routed to the WebView 312. For example, VideoView 314 may transmit a message that indicates that it has downloaded a sufficient portion of the video such that playback can likely occur without interruption. As another example, VideoView 314 may transmit a message that indicates that the video has finished playing. As another example, VideoView 314 may transmit one or more messages that indicate the playback progress of the video that is playing.

WebView 312 may transmit various messages to the content SDK using the messaging code, which may be routed to the VideoView 314. For example, WebView 312 may transmit messages that indicate that a video should be downloaded, played, paused, stopped and the like. The WebView 312 may cause video controls (e.g., see FIG. 4A, part 406) to display in the webpage window. The video controls may include one or more buttons or playback functions that allow a user to interact with the WebView and that cause the WebView 312 to generate messages. HTML and/or JavaScript code executed by the WebView may be designed to create one or more button objects, where the button object gets displayed on the webpage window and listens for and handles interaction from a user. The video controls may be associated with the messaging code such that user interaction with the one or more buttons may cause the WebView to communicate one or more messages to the content SDK and, in turn, to the VideoView. As one example, the user may touch a "play" button on the screen of the mobile device 306, and that may cause the WebView to transmit a message that indicates that a video should be played.

In one particular implementation, the WebView 312 and the VideoView 314 may be oriented and/or customized such that they appear to a user to be integrated. For example, the VideoView 314 may appear to display within a WebView 312 (e.g., see FIGS. 4A and 4B). This implementation may be used to address one or more of the issues discussed above regarding playing inline HTML <video> tags. The HTML code rendered by the WebView may include a <video> tag, for example, that was intended to cause a video window to open within the webpage. WebView 312 may render the HTML code to replacing the <video> tag with messaging code such as JavaScript, and optionally, additional code. The messaging code and/or the additional code may include an iframe or div HTML object (or other transparent HTML object). An iframe or div object (or other transparent HTML object) allows a webpage to show a window or frame within a webpage. The iframe or div object (or other transparent HTML object) may be programmed to create a window or frame that is about the same size as the video window that was intended by the original <video> tag. The iframe (or other transparent HTML object) or div object may be programmed to be transparent or invisible, such that content displayed on the mobile device 306 "behind" the WebView 312 may show through the transparent frame. Additionally, the body of the HTML webpage and the background of the WebView may be programmed to be transparent as well, for example, in an area that aligns or overlaps with the transparent frame created by the iframe or div object. For example, in order from back to front, the WebView may be rendered with a transparent background, and then the HTML may be rendered with a transparent body, and then, inside the HTML body, the transparent iframe may rendered. In this respect, the VideoView and/or related video window may display through the WebView background, the HTML body and the transparent iframe or div object.

Figure 4A:
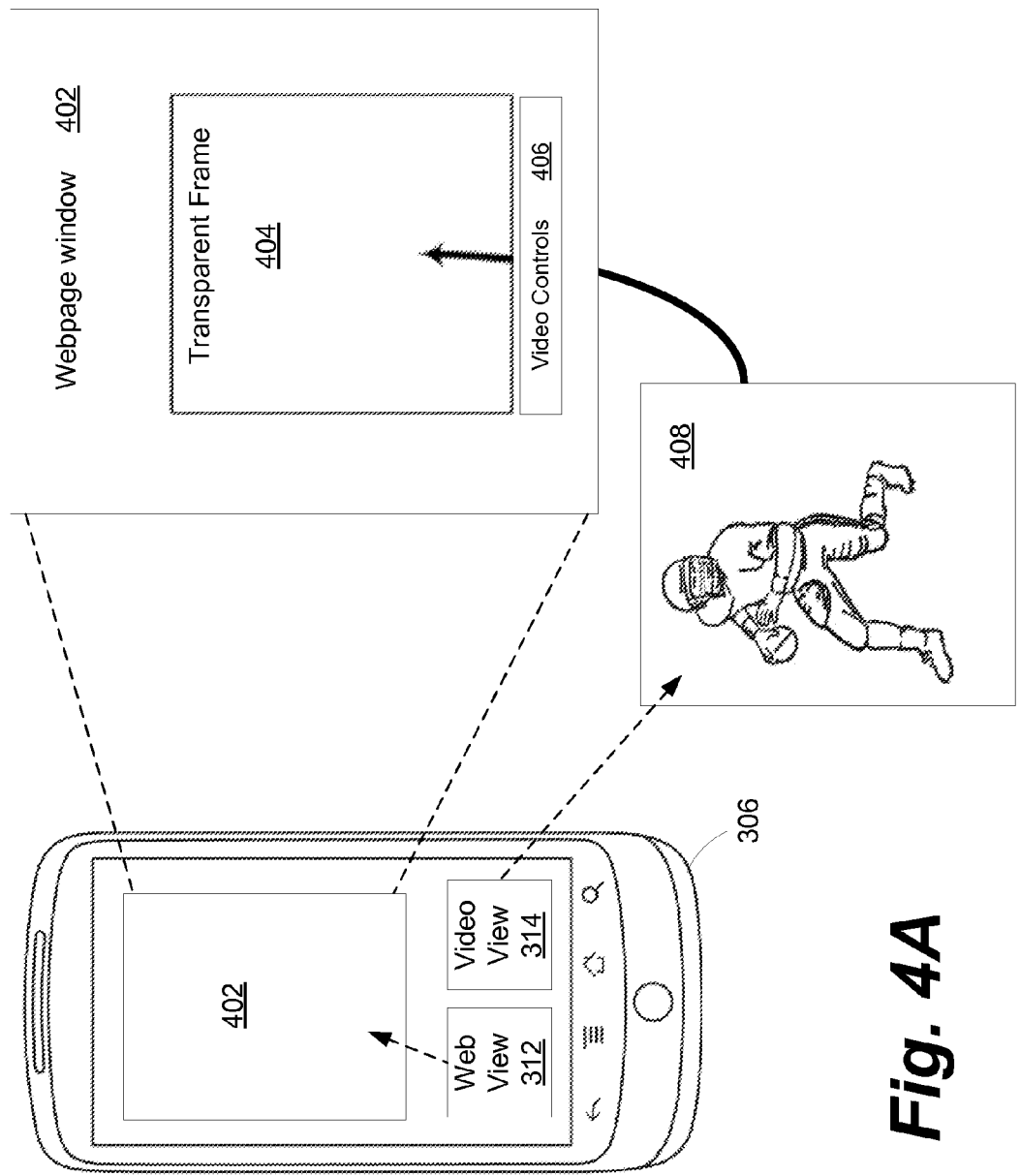
FIGS. 4A and 4B depict an illustration of an example mobile device or smartphone and various example pieces of code or functions that may run or execute on a mobile device and various example windows that may display on a mobile device, according to one or more embodiments of the present disclosure.
Figure 4B:
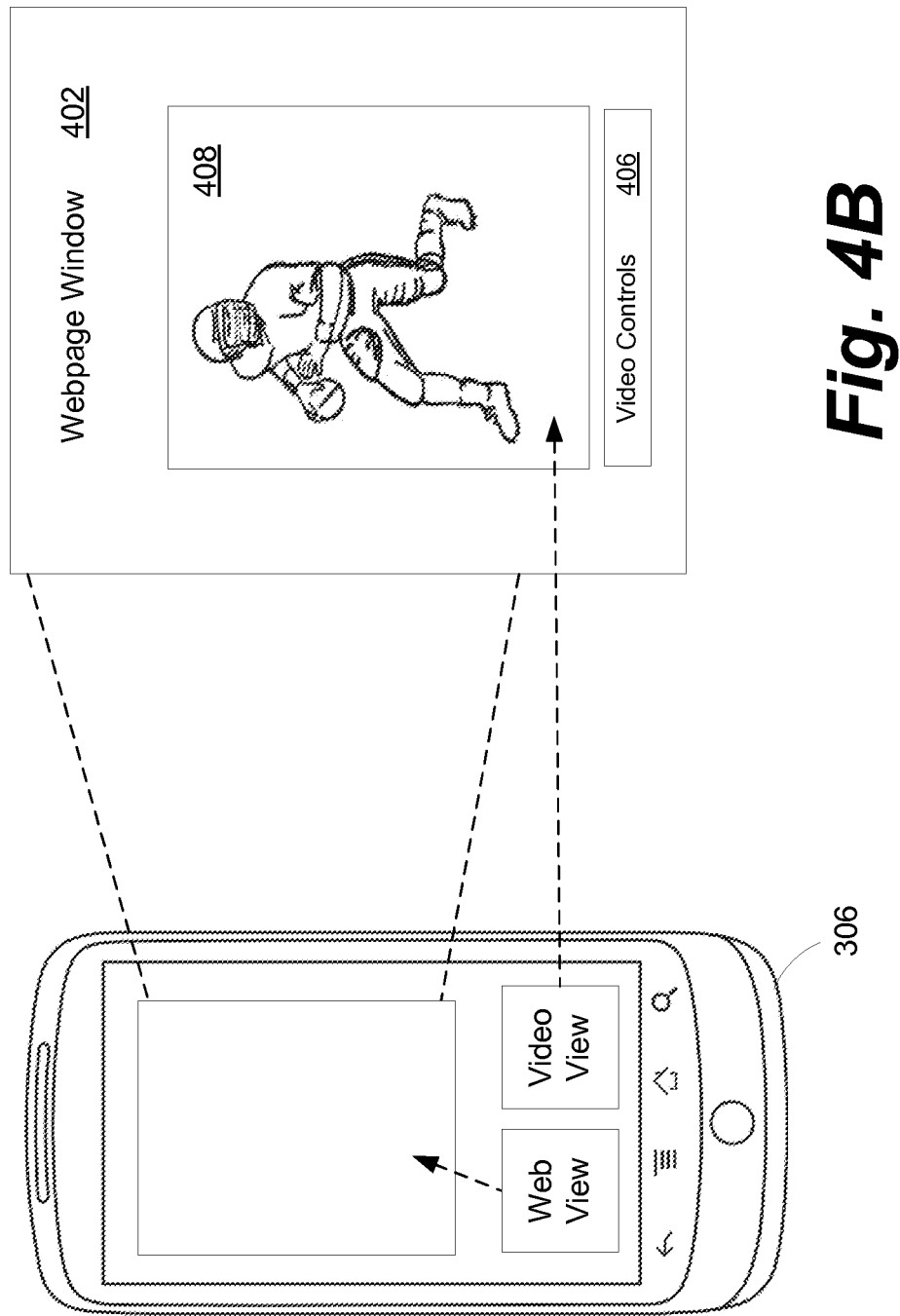

Referring to FIGS. 4A and 4B as one example, WebView 312 may execute the rendered HTML code, including the iframe (or div) and messaging code, to display a webpage window 402 with a transparent frame 404. As one example, when an iframe loads (e.g., the iframe object that creates the transparent frame 404), the WebView 312 may read the "source" field of the iframe. The source field may generally tell the web browser where (e.g., a URL to a website) it can find the content to fill the iframe. In some embodiments, the source field may contain a special URL, as explained above, that may be encoded with a message, for example, a message indicating that a VideoView 314 should be initiated. In other embodiments, other messaging code may indicate that a VideoView 314 should be initiated. The WebView 312 may communicate a message to the content SDK 318, instructing the content SDK to initiate a VideoView 314, for example, a video window 408 with a particular size and screen location. The VideoView may create a video window 408 without any borders, controls or the like. In other words, the video window may be a bare video window. The VideoView 314 may cause the video window to display "behind" (i.e., layered behind) the webpage window 402 (compare FIG. 4A to FIG. 4B). As can be seen in FIG. 4B, the video window 408 may show through the transparent frame 404 such that it appears to a user that the video is embedded in, or integrated into, the webpage. Once the WebView 312 and the VideoView 314 have been initiated and customized, the messaging system (see FIG. 3, part 320) may be used to allow and/or facilitate communications between the WebView 312 (and the messaging code running therein) and the VideoView 314, via the content SDK 318. In this respect, and referring to FIGS. 4A and 4B, the webpage window 402 may communicate with the video window 408 behind it.

In some embodiments of the present disclosure, the video window may be displayed or overlayed "in front of" the webpage window 402 instead of behind it. In this case, the messaging code that is executed by the WebView 312 may be programmed to communicate the appropriate messages to the VideoView 314 to create this overlayed video window. In these embodiments, a transparent iframe or div object (or other transparent HTML object) may or may not be used. Overlayed video windows may be useful for a variety of purposes, for example, branded video.

Referring to FIGS. 4A and 4B, the WebView 312 may cause video controls 406 to display in the webpage window 402. The video controls may include one or more buttons, sliders or other playback functions that allow a user to interact with the WebView 312. User interaction with the video controls 406 may cause the WebView 312 to generate messages that get sent to the content SDK and, in turn, to the VideoView 314. HTML and/or JavaScript code executed by the WebView may be designed to create one or more button objects, where the button object gets displayed on the webpage window 402 and listens for and handles interaction from a user. As one example, the user may touch a "play" button on the screen of the mobile device 306, and that may cause the WebView to transmit a message that indicates that a video should be played. The video controls 406 may also provide feedback to a user, for example, feedback as a result of one or more messages sent by the VideoView and received by the WebView. As one example, the VideoView may communicate one or more messages to the content SDK that indicate the progress of the video that is playing. The content SDK may route these messages to the WebView, and the WebView may cause a slider, progress bar or the like to update, for example, updating the video controls 406 that display on the webpage window 402.

WebView 312 may include one or more customized elements that appear to be integrated with the video window. For example, WebView 312 may include one or more advertisements around the video window. In this example, the WebView 312 may communicate, for example, indirectly, with one or more content severs (e.g., content server 324 of FIG. 3) or advertising servers to download content to display in the one or more customized elements. As one specific example, WebView 312 may download an advertisement from an advertising server and display the advertisement in a banner or border near or around the video window. Even though the previous example explains an advertising situation, it should be understood that this disclosure contemplates various ways of customizing native views with HTML (and optionally other code like JavaScript) and various types of content. The content SDK 318 may provide developers with the appropriate functions to create content requests (e.g., URLs) and GUI components in their application code. The content requests and/or GUI components may be programmed to display banners, text and/or multimedia content at the appropriate location in the webpage window, and at a time appropriate for content integration.

It should be understood that the systems, methods, routines and/or techniques described herein may be applied to various other numbers and types of native views, beyond just a WebView and a VideoView. For example, a WebView may interact with multiple VideoViews. Other types of native views may include a MapView that displays interactive map(s), a GameView that displays interactive game(s), a PhotoView that displays local and/or remote photo(s), a CameraView that displays scenes or pictures as captured by one or more cameras on a mobile device, and/or any other native view. A messaging system, similar to the messaging system described in detail herein, may be adapted to allow and/or facilitate communication between one or more of these native views and/or other native views. The techniques described herein may be used to customize one or more of these native views, and/or may be used to integrate two or more of these native views. As one specific example, a WebView may communicate a message to an SDK to create a CameraView, and the CameraView may be integrated into the WebView such that it appears that a camera window exists within a webpage window. Additionally, the WebView may be customize the webpage window to enhance the integration and/or appearance of the integrated native views. For example, a webpage window could include a human head with a transparent frame in the middle, and a camera window may show through the transparent frame such that it appears that a user's face is displayed within the human head. As another example, a webpage window could include an interactive drawing function with a transparent frame in the middle, and a camera window may show through the transparent frame such that it appears that a landscape that a user is capturing displays in the webpage window and the user can draw over top of it. Various other examples of integration between one or more native views will be readily apparent after referencing this disclosure. Various techniques disclosed herein with regard to messaging between native views, integrating and customizing native views and adding content to native views may be used to implement these various examples.

Certain embodiments of the present disclosure may be found in one or more methods to customize native operating system views using web technologies in mobile devices. With respect to the various methods described herein and depicted in associated figures, it should be understood that, in some embodiments, one or more of the steps described and/or depicted may be performed in a different order. Additionally, in some embodiments, a method may include more or fewer steps than are described and/or depicted.

Figure 5:
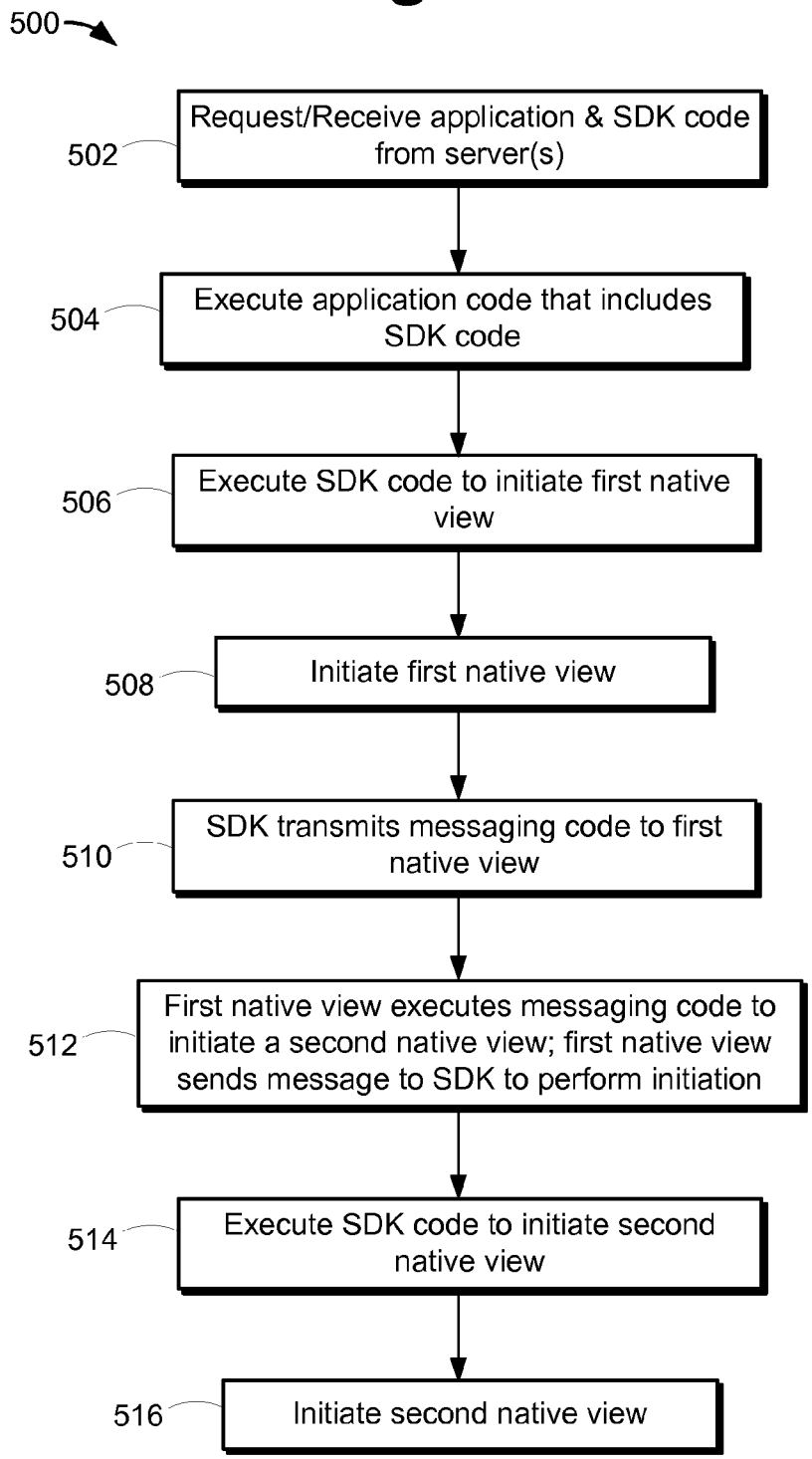
FIG. 5 depicts a flow diagram that shows example steps in a method to customize native operating system views, in accordance with one or more embodiments of the present disclosure.

FIG. 5 depicts a flow diagram 500 that shows example steps in a method to customize native operating system views, in accordance with one or more embodiments of the present disclosure. In particular, FIG. 5 may show example steps that include initiating a first native view and a second native view. At step 502, a mobile device may download (i.e., request and receive) an application and a content SDK from one or more servers, for example, an application server. The application may include HTML code, JavaScript code and/or other code and/or components. At step 504, the application may be executed. The mobile device, for example, via an included processor, may execute the application code. At some point, also generally referenced by step 504, the mobile device may execute application code that utilizes the content SDK, for example, code that requests the initiation of a first native view, for example, a WebView. As one example, the code of the application may include HTML code to place a web browser window within the application, and the HTML code may include code to place a video within the web browser window (e.g., using an HTML <video> tag). At step 506, the content SDK may communicate with the first native view (e.g., a WebView) to initiate the first native view (e.g., to create a web browser window). At step 508, the first native view is initiated, for example, a web browser window is displayed on the mobile device. At step 510, the content SDK may transmit messaging code (e.g., JavaScript code) to the first native view (e.g., a WebView) that may adapt the first native view to send messages to the content SDK and, in turn, to other native views. Also at step 510, the content SDK may transmit other code to the first native view, for example, code from the application that the first native view will execute. As one example, the content SDK may transmit HTML code and/or JavaScript code to a WebView such that the WebView can render the HTML and display the associated web page.

At step 512, the first native view may perform various routines and/or functions according to its purpose, for example, a WebView may create a webpage window that displays on the screen of the mobile device. Also at step 512, the first native view may execute the messaging code, for example, messaging code that relates to a video. By executing the messaging code, the first native view may be adapted to transmit and receive messages to/from the content SDK, for example, messaging related to initiating a second native view. At step 512, the first native view may communicate a message to the content SDK instructing the content SDK to initiate a second native view, for example, a VideoView. At step 514, the content SDK may communicate with a second native view such that the second native view causes a function to occur, for example, a VideoView may cause a video window with a particular size and screen location to display on the mobile device. At step 516, the second native view is initiated, for example, a video window is displayed on the mobile device. The second native view may also perform one or more functions, for example, a VideoView may start to download a video.

Figure 6:
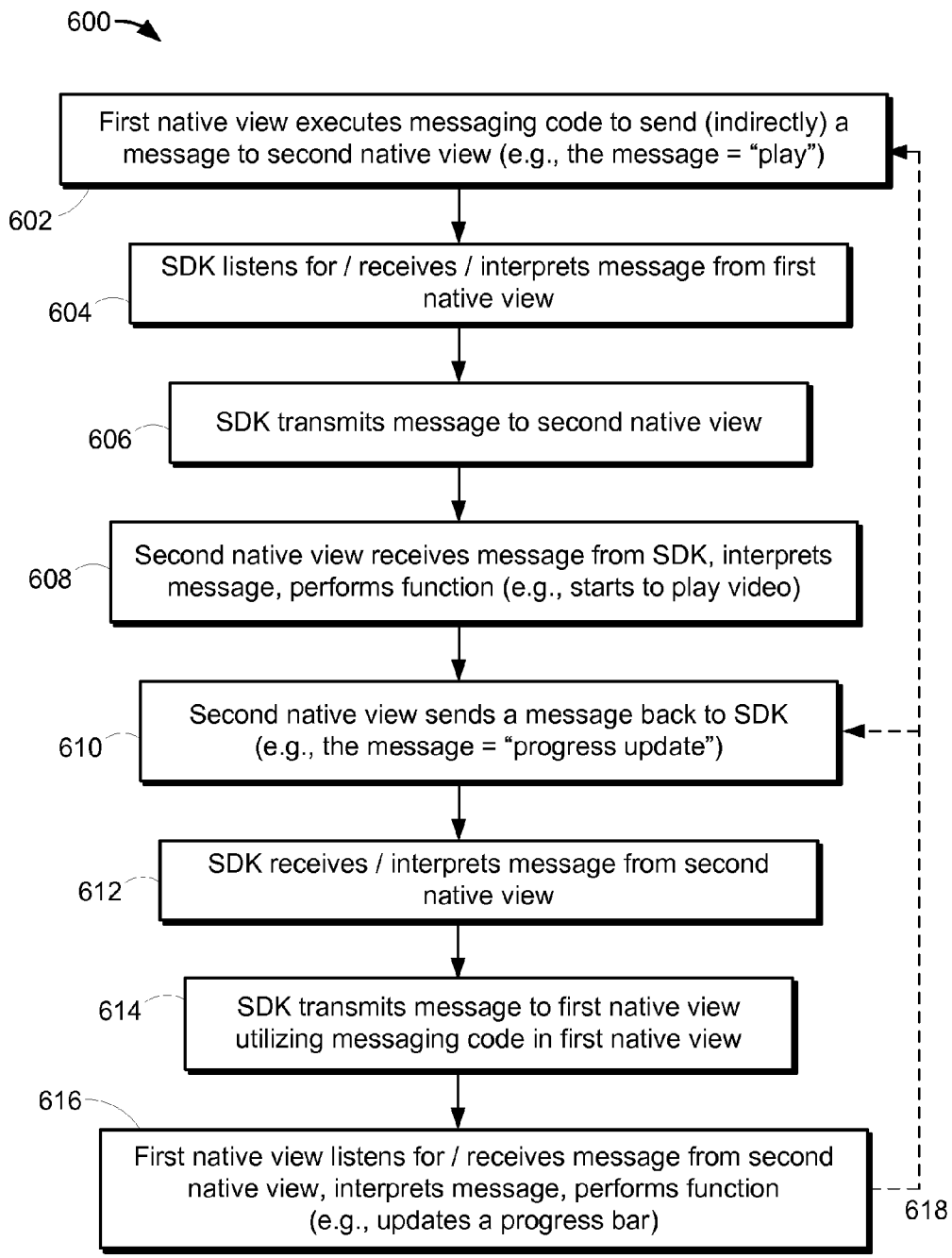
FIG. 6 depicts a flow diagram that shows example steps in a method to customize native operating system views, in accordance with one or more embodiments of the present disclosure.

FIG. 6 depicts a flow diagram 600 that shows example steps in a method to customize native operating system views, in accordance with one or more embodiments of the present disclosure. In particular, FIG. 6 may show example steps that include a first native view and a second native view communicating, e.g., sending messages back and forth. At step 602, a first native view, for example, a WebView, may execute messaging code, for example, messaging code that relates to a video. By executing the messaging code, the first native view may be adapted to transmit and receive messages to/from a content SDK. For example, at step 602, the first native view may communicate a message to the content SDK, where the message is intended to be sent to a second native view. As one example, the message may indicate that the second native view, for example, a VideoView, should play a video. At step 604, the content SDK may listen for and/or receive the message from the first native view. The SDK may interpret the message. At step 606, the SDK may transmit the message to the second native view. At step 608, the second native view may receive the message from the SDK. The second native view may interpret the message and then perform one or more functions according to its purpose, for example, a VideoView may start to play a video. At step 610, the second native view may send one or more messages back to the SDK, for example, a VideoView may send one or more progress updates. At step 612, the SDK may receive and interpret the message from the second native view. At step 614, the SDK may transmit the message to the first native view, for example, utilizing the messaging code in the first native view and, optionally, other code in the SDK. At step 616, the first native view listens for and/or receives the message from the SDK/second native view. The first native view may then perform one or more functions according to its purpose, for example, a WebView may update certain video controls and/or video control objects, for example, to update a progress bar that displays on a webpage. At step 618, FIG. 6 shows a loop back to one or more previous steps of the flow diagram 600. This should not be interpreted as a requirement of any particular loop back and/or any particular sequence of instructions. The loop back shown at step 618 may signify that messages may constantly and/or continuously be flowing between the first native view and the second native view. For example, a WebView may at various times send various messages to a VideoView, for example, messages that indicate that a video should be downloaded, played, paused, stopped and the like. Likewise, a VideoView may at various times send various messages to a WebView, for example, messages that indicate that a video has downloaded or ended playback, or a message indicating the progress of playback, or other message(s).

Various embodiments of the present disclosure describe one or more systems, methods, routines and/or techniques for customizing native operating system views using web technologies in mobile devices. In one or more embodiments, a method may be executed on a computer, mobile device, smartphone or the like. The method may include executing software development kit code to communicate messaging code to a first native operating system view, and executing, in the first native operating system view, the messaging code to communicate one or more first messages from the first native operating system view to a second native operating system view. The software development kit code may be executed to receive and/or handle the one or more first messages from the first native operating system view and route and/or transmit the one or more first messages to the second native operating system view. The method may include executing the software development kit code to initiate the first native operating system view, and executing the software development kit code to initiate the second native operating system view in response to one of the one or more first messages communicated from the first native operating system view. The method may include executing the software development kit code to listen for and/or receive one or more second messages communicated from the second native operating system view. The method may include executing, in the first native operating system view, the messaging code to listen for and/or receive the at least one of the one or more second messages from the second native operating system view.

In some embodiments, the first native operating system view is a WebView and the second native operating system view is a VideoView. The method may include executing the software development kit code to communicate HTML code and JavaScript code to the first native operating system view. The method may include rendering and executing, in the first native operating system view, the HTML code and the JavaScript code to cause a webpage window to display on the computer or mobile device. The method may include executing, in the first native operating system view, modification code that replaces one or more tags in the HTML code with the messaging code. In some embodiments, one of the one or more tags are HTML5 <video> tags. In some embodiments, the webpage window may contain a transparent frame, and the second native operating system view may cause a video window to display on the computer or mobile device behind the webpage window such that the video window displays through the transparent frame. In some embodiments, the webpage window may contain video controls that include one or more buttons and/or sliders. The one or more buttons and/or sliders may be adapted to allow a user to interact. The video controls may be associated with the messaging code such that user interaction with the one or more buttons and/or sliders causes the first native operating system view to communicate one or more messages to the second native operating system view.

In one or more embodiments of the present disclosure, a method may be executed on a computer, mobile device, smartphone or the like. The method may include executing, in a first native operating system view, messaging code to communicate a first message from the first native operating system view to software development kit code. The method may include executing the software development kit code to listen for and/or receive the first message, and executing the software development kit code to communicate the first message to a second native operating system view. The method may include executing code in the second native operating system view to receive the first message, and executing code in the second native operating system view to perform a first native function associated with the first message. The method may include executing code in the second native operating system view to communicate a second message to the software development kit code. The method may include executing the software development kit code to listen for and/or receive the second message, and executing the software development kit code to communicate the second message to the first native operating system view. The method may include executing, in a first native operating system view, messaging code to listen for and/or receive the second message, and executing code in the first native operating system view to perform a second native function associated with the second message.

In some embodiments, the first native operating system view is a WebView and the second native operating system view is a VideoView. In some embodiments, the first message may indicate to the second native operating system view that it should perform one or more of the following functions related to a video: download the video, play the video, pause the video, or stop the video. In some embodiments, the second message may indicate to the first native operating system view one of the following status updates related to a video: the video is downloaded enough to play without interruption, the video has finished playing, or an update related to the playback progress of the video.

In one or more embodiments of the present disclosure, a method may be executed on a computer, mobile device, smartphone or the like. The method may include executing code to initiate a first native operating system view. The first native operating system view may cause a webpage window to display on the computer or mobile device, and the webpage window may contain a transparent frame. The method may include executing code to initiate a second native operating system view. The second native operating system view may cause a video window to display on the computer or mobile device, and the video window may be positioned or layered behind the webpage window and display through the transparent frame. The method may include executing code in the first native operating system view to request and receive content from a content server, and executing code in the first native operating system view that causes the content to display in the webpage window near the transparent frame. The method may include executing messaging code to facilitate communications between the first native operating system view and the second native operating system view.

In some embodiments, the content is advertising content and the content server is an advertising server. The advertising content may be displayed as a banner around at least a portion of the transparent frame, and the video window may appear to a user to be embedded in the webpage window and the advertising content may appear to a user to be displayed around the video window. The method may include executing code in the first native operating system view that causes video controls to display in the webpage window near the transparent frame. The method may include executing code in the first native operating system view that receives information from the video controls, and executing the messaging code to send a message from the first native operating system view to the second native operating system view. The message may relate to the information received from the video controls (e.g., play a video). The message may include executing code in the second native operating system view to perform a function (e.g., play a video) in response to the message. In this respect, the function may relate to the information received from the video controls.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 7:
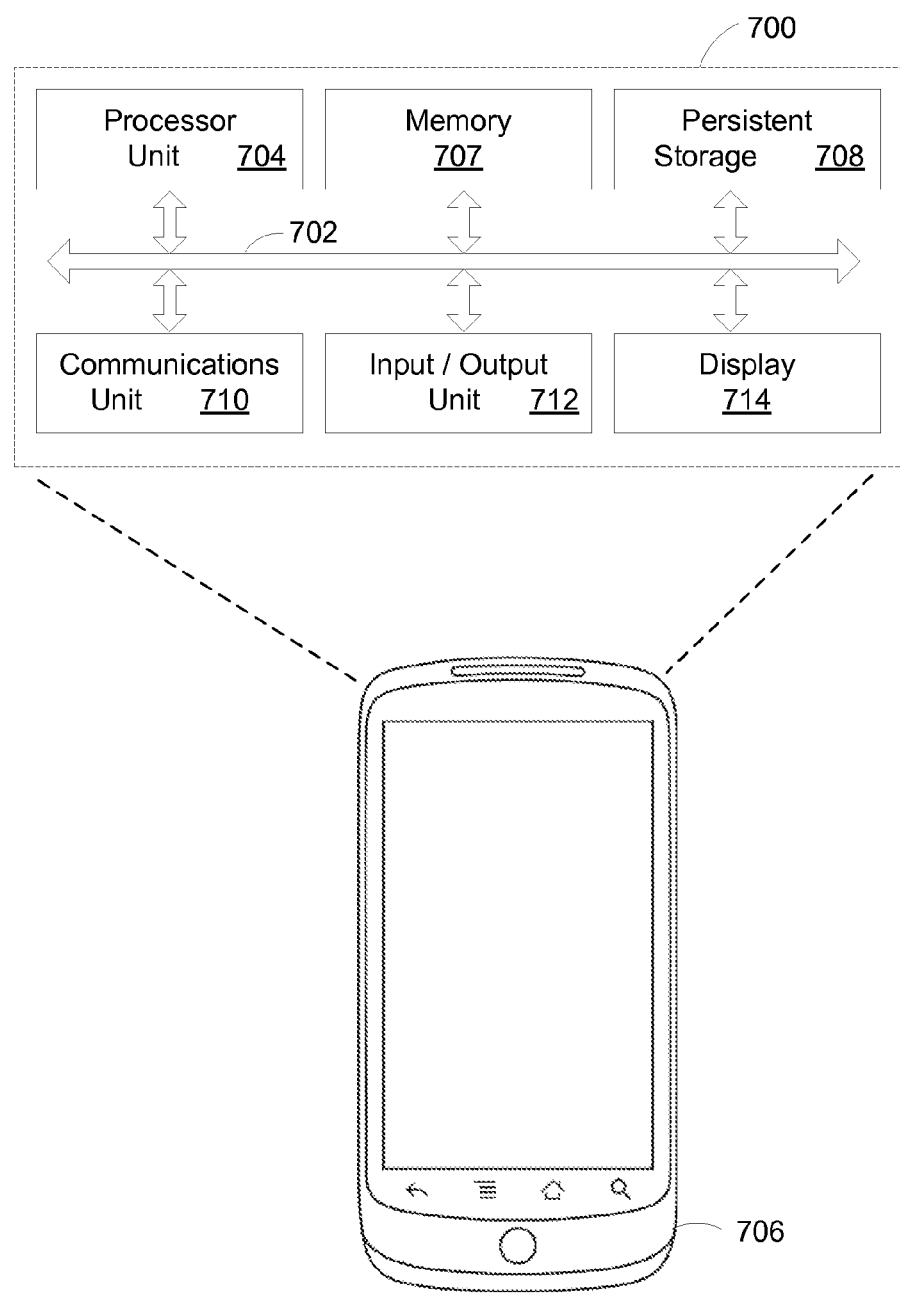
FIG. 7 depicts a block diagram of an example data processing system that may be included within a mobile device or smartphone, according to one or more embodiments of the present disclosure.

FIG. 7 depicts a block diagram of an example data processing system 700 that may be included within a mobile device 706 or smartphone, according to one or more embodiments of the present disclosure. The data processing system 700 may be used to execute, either partially or wholly, one or more of the methods, routines and/or solutions of the present disclosure. In some embodiments of the present disclosure, more than one data processing system, for example data processing systems 700, may be used to implement the methods, routines, techniques and/or solutions described herein. In the example of FIG. 7, data processing system 700 may include a communications fabric 702 which provides communications between components, for example a processor unit 704, a memory 707, a persistent storage 708, a communications unit 710, an input/output (I/O) unit 712 and a display 714. A bus system may be used to implement communications fabric 702 and may be comprised of one or more buses such as a system bus or an input/output bus. The bus system may be implemented using any suitable type of architecture that provides for a transfer of data between different components or devices attached to the bus system.

Processor unit 704 may serve to execute instructions (for example, a software program, an application, SDK code, native OS code and the like) that may be loaded into the data processing system 700, for example, into memory 707. Processor unit 704 may be a set of one or more processors or may be a multiprocessor core depending on the particular implementation. Processor unit 704 may be implemented using one or more heterogeneous processor systems in which a main processor is present with secondary processors on a single chip. As another illustrative example, processor unit 704 may be a symmetric multi-processor system containing multiple processors of the same type.

Memory 707 may be, for example, a random access memory or any other suitable volatile or nonvolatile storage device. Memory 707 may include one or more layers of cache memory. Persistent storage 708 may take various forms depending on the particular implementation. For example, persistent storage 708 may contain one or more components or devices. For example, persistent storage 708 may be a hard drive, a solid-state drive, a flash memory or some combination of the above.

Instructions for an operating system may be located on persistent storage 708. In one specific embodiment, the operating system may be some version of a number of known operating systems for mobile devices or smartphones (e.g, Android, iOS, etc.). Instructions for applications and/or programs may also be located on persistent storage 708. These instructions may be loaded into memory 707 for execution by processor unit 704. For example, the methods and/or processes of the different embodiments described in this disclosure may be performed by processor unit 704 using computer implemented instructions which may be loaded into a memory such as memory 707. These instructions are referred to as program code, computer usable program code or computer readable program code that may be read and executed by a processor in processor unit 704.

Display 714 may provide a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 712 allows for input and output of data with other devices that may be connected to data processing system 700. Input/output devices can be coupled to the system either directly or through intervening I/O controllers.

Communications unit 710 may provide for communications with other data processing systems or devices, for example, via one or more networks. Communications unit 710 may be a network interface card. Communications unit 710 may provide communications through the use of wired and/or wireless communications links. In some embodiments, the communications unit may include circuitry that is designed and/or adapted to communicate according to various wireless communication standards, for example, cellular standards, WiFi standards, Bluetooth standards and the like.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method comprising:
   in a computer or mobile device comprising an application layer and an operating system (OS) layer:
   executing software development kit (SDK) code to communicate messaging code to a first native operating system view, wherein the SDK code is part of the application layer and wherein the first native operating system view includes a webpage window containing a transparent frame; and
   executing, in the first native operating system view, the messaging code to communicate one or more first messages from the first native operating system view to a second native operating system view, wherein the second native operating system view includes a video window layered with the webpage window and for display through the transparent frame, and wherein:
   the SDK code is executed to receive the one or more first messages from the first native operating system view and to route and/or transmit the one or more first messages to the second native operating system view; and
   the first native operating system view and the second native operating system view are part of the OS layer.

2. The method of claim 1, further comprising:
   executing the SDK code to initiate the first native operating system view; and
   executing the SDK code to initiate the second native operating system view in response to one of the one or more first messages communicated from the first native operating system view.

3. The method of claim 2, wherein the first native operating system view is a WebView and the second native operating system view is a VideoView.

4. The method of claim 3, further comprising executing the SDK code to communicate HTML code and JavaScript code to the first native operating system view.

5. The method of claim 4, further comprising rendering and executing, in the first native operating system view, the HTML code and the JavaScript code to cause the webpage window to display on the computer or mobile device.

6. The method of claim 4, further comprising executing, in the first native operating system view, modification code that replaces one or more tags in the HTML code with the messaging code.

7. The method of claim 6, wherein at least one of the one or more tags is a HTML5 <video> tag.

8. The method of claim 5, wherein:
initiating the second native operating system view includes causing the video window to display on the computer or mobile device behind the webpage window such that the video window displays through the transparent frame.

9. The method of claim 8, wherein the webpage window contains video controls that include one or more buttons and/or sliders, and wherein:
the video controls are associated with the messaging code such that an input received by the one or more buttons and/or sliders causes the first native operating system view to communicate one or more messages to the second native operating system view.

10. The method of claim 1, further comprising:
executing the SDK code to listen for and/or receive one or more second messages communicated from the second native operating system view; and
executing, in the first native operating system view, the messaging code to listen for and/or receive the at least one of the one or more second messages from the second native operating system view.

11. A method comprising:
in a computer or mobile device comprising an application layer and an operating system (OS) layer:
executing, in a first native operating system view, messaging code to communicate a first message from the first native operating system view to software development kit (SDK) code, wherein the SDK code is part of the application layer and wherein the first native operating system view includes a webpage window containing a transparent frame; executing the SDK code to listen for and/or receive the first message; executing the SDK code to communicate the first message to a second native operating system view; wherein the second native operating system view includes a video window layered with the webpage window and for display through the transparent frame, and; executing code in the second native operating system view to receive the first message; and
executing code in the second native operating system view to perform one or more native functions associated with the first message, including downloading a video, playing a video, pausing a video, and stopping a video within the vide window, wherein the first native operating system view and the second native operating system view are part of the OS layer.

12. The method of claim 11, further comprising:
executing code in the second native operating system view to communicate a second message to the software development kit code;
executing the SDK code to listen for and/or receive the second message;
executing the SDK code to communicate the second message to the first native operating system view;
executing, in a first native operating system view, messaging code to listen for and/or receive the second message; and
executing code in the first native operating system view to update a progress bar that displays in the first native operating system view, wherein the progress bar is based on the second native operating system view.

13. The method of claim 12, wherein the first native operating system view is a WebView and the second native operating system view is a VideoView.

14. The method of claim 13 wherein the second message indicates to the first native operating system view one or more status updates of a video, including a portion of the video is downloaded, such that the video is configured to be played, the video is downloaded, and the video has finished playing.

15. A method comprising:
in a computer or mobile device comprising an application layer and an operating system (OS) layer:
executing code to initiate a first native operating system view, wherein the first native operating system view causes a webpage window to display on the computer or mobile device, and wherein the webpage window contains a transparent frame;
executing code to initiate a second native operating system view, wherein the second native operating system view causes a video window to display on the computer or mobile device, and wherein the video window is layered behind the webpage window and displays through the transparent frame;
executing code in the first native operating system view to request and receive content from a content server;
executing code in the first native operating system view that causes the content to display in the webpage window with the transparent frame as a banner around at least a portion of the transparent frame; and
executing messaging code to send a message from the first native operating system view to the second native operating system view, wherein the first native operating system view and the second native operating system view are part of the OS layer.

16. The method of claim 15, wherein the content is advertising content and the content server is an advertising server.

17. The method of claim 15, further comprising:
executing code in the first native operating system view that causes video controls to display in the webpage window with the transparent frame;
executing code in the first native operating system view that receives information from the video controls,
wherein the message relates to the information received from the video controls.

18. The method of claim 17, further comprising executing code in the second native operating system view to perform a function in response to the message, wherein the function relates to the information received from the video controls.

19. A method comprising:
in a computer or mobile device comprising an application layer and an operating system (OS) layer:
executing code to initiate a first native operating system view, wherein the first native operating system view causes a webpage window to display on the computer or mobile device, and wherein the webpage window contains a transparent frame;
executing code to initiate a second native operating system view, wherein the second native operating system view causes a video window to display on the computer or mobile device, and wherein the video window is layered behind the webpage window and displays through the transparent frame;

executing code in the first native operating system view to request and receive content from a content server, wherein the content is advertising content and the content server is an advertising server;

executing code in the first native operating system view that causes the content to display as a banner around at least a portion of the transparent frame; and executing messaging code to facilitate communications between the first native operating system view and the second native operating system view, wherein the first native operating system view and the second native operating system view are part of the OS layer.

* * * * *